United States Patent [19]
Okamoto et al.

[11] Patent Number: 5,317,461
[45] Date of Patent: May 31, 1994

[54] MAGNETIC DISK APPARATUS HAVING A CIRCUIT FOR DETECTING A POSITION OF SERVO INFORMATION RECORDED ON A TARGET TRACK

[75] Inventors: Terumitsu Okamoto; Tomoaki Nakamura, both of Tokyo, Japan

[73] Assignee: NEC Corporation, Tokyo, Japan

[21] Appl. No.: 860,015

[22] Filed: Mar. 30, 1992

[30] Foreign Application Priority Data

Mar. 29, 1991 [JP] Japan .................................. 3-091523

[51] Int. Cl.⁵ .............................................. G11B 5/596
[52] U.S. Cl. ................................ 360/77.08; 360/78.14
[58] Field of Search ................ 360/77.08, 78.14, 51; 369/47, 48; 377/78

[56] References Cited

U.S. PATENT DOCUMENTS

| | | | |
|---|---|---|---|
| 4,875,114 | 10/1989 | Moteki | 360/78.14 |
| 5,023,732 | 6/1991 | Murakami et al. | 360/77.08 |
| 5,027,234 | 6/1991 | Kawahara | 360/77.08 |
| 5,053,899 | 10/1991 | Okawa et al. | 360/77.08 |

FOREIGN PATENT DOCUMENTS

| | | | |
|---|---|---|---|
| 0032276 | 2/1986 | Japan | 360/78.14 |
| 0086587 | 4/1987 | Japan | 360/77.08 |

*Primary Examiner*—Thomas E. Denion
*Attorney, Agent, or Firm*—Sughrue, Mion, Zinn, Macpeak & Seas

[57] ABSTRACT

A magnetic disk apparatus detects servo information on a magnetic disk which includes a plurality of concentric tracks which are provided with an alternate arrangement of data areas and servo areas. The apparatus includes a servo ID detecting circuit which generates a first detection signal when a servo area including an identification signal is detected and a data reproducing circuit which generates a second detection signal when read data pulses are detected on the signal reproduced from the magnetic disk. Sampling pulses are generated when the second detection signal indicates that the generation of read data pulses has terminated, while the first detection signal indicates the presence of the identification signal. The positional error of the magnetic head of the magnetic disk apparatus with respect to the target track of the magnetic disk is determined from the servo information of the signal reproduced from the magnetic disk in synchronism with the sampling pulses.

8 Claims, 7 Drawing Sheets

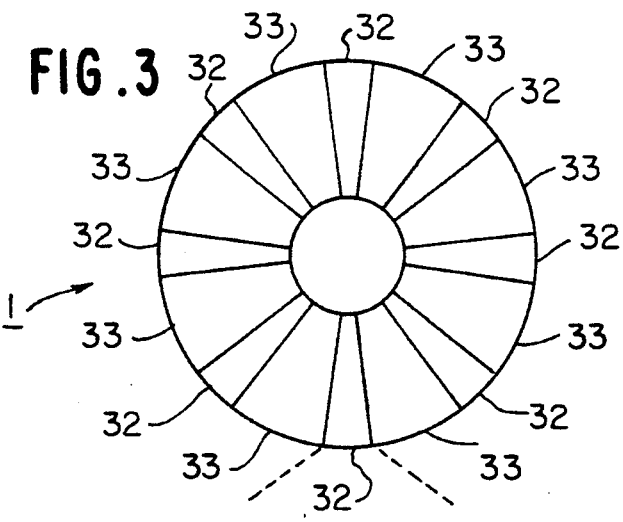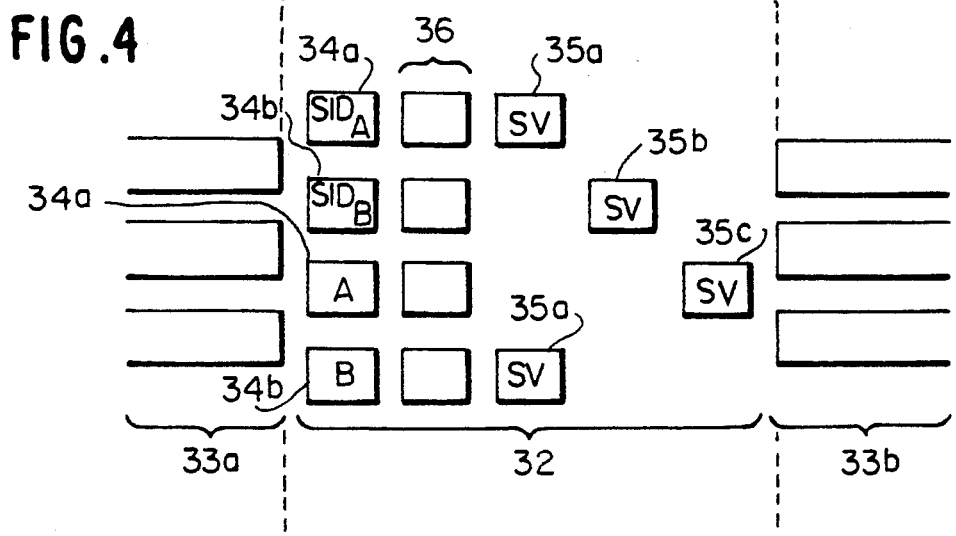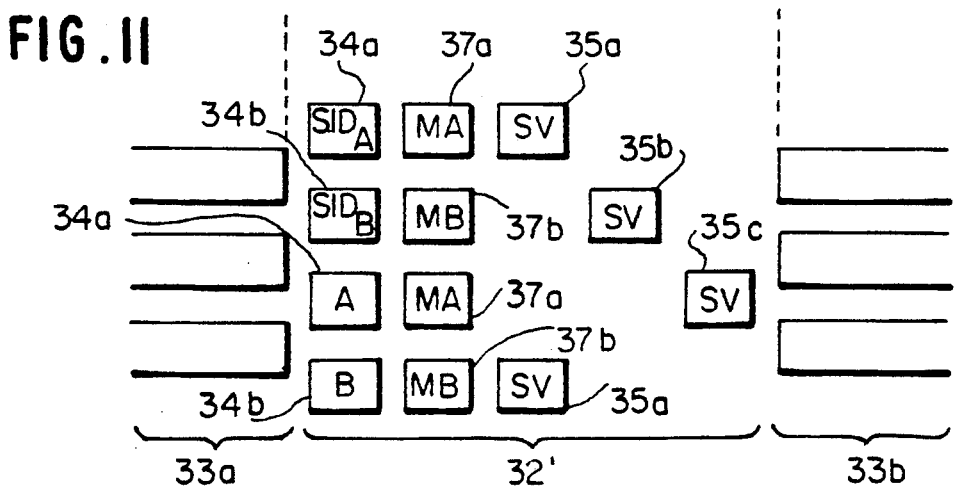

MAGNETIC DISK APPARATUS HAVING A CIRCUIT FOR DETECTING A POSITION OF SERVO INFORMATION RECORDED ON A TARGET TRACK

BACKGROUND OF THE INVENTION

The present invention relates to a magnetic disk apparatus which positions its magnetic head at a target track by using servo information recorded on a magnetic disk.

A magnetic disk apparatus of this kind is described in U.S. Pat. Nos. 5,053,899 and 5,023,732, assigned to the same assignee as the present invention. A magnetic disk, which is a recording medium of the magnetic disk apparatus, has data areas and servo areas alternately arranged in a circumferential direction along concentric circular tracks. In each of the servo areas, a servo identification (ID) section, in which a predetermined pattern signal is recorded at a different recording frequency from that of the data areas, and a servo information section are arranged in that order.

After the magnetic disk apparatus positions its magnetic head roughly at a target track in a track seek mode, the apparatus shifts to a track following mode, in which the apparatus reads with its magnetic head two adjoining servo information signals from the servo information section in the servo area so as to generate a positional error signal by determining the difference between the two servo information signals. This positional error signal is used for positioning the magnetic head finely on the center line of the target track.

In order to detect the position of the servo information section on the target track, the aforementioned servo ID section is provided. The magnetic disk apparatus compares a voltage of a reproduced pattern signal from the servo ID section with a predetermined threshold, and generates timing pulses triggered by a time point at which the voltage of the reproduced pattern signal surpasses the threshold. The apparatus samples the reproduced servo information signals read out by the magnetic head in synchronism with the timing pulses, and thereby detects the value of the servo information signals.

In the conventional magnetic disk apparatus, when the voltage of the reproduced pattern signal from the servo ID section varies, the timing at which this voltage surpasses the threshold, i.e. the starting time point for generating the timing pulses, also varies, causing a variation in the output timing of the timing pulses. Accordingly, the servo information should be recorded in a sufficiently large area to allow for the range of this timing variation. This means that the servo information section is sufficiently large and, consequently, requiring long servo areas in the tracking direction. As a result, the data areas are correspondingly reduced, so as to reduce the data recording capacity.

SUMMARY OF THE INVENTION

An object of the present invention, therefore, is to provide a magnetic disk apparatus capable of reducing a variation range of timing pulses for sampling of servo information.

Another object of the invention is to provide a magnetic disk apparatus capable of reducing recording areas of servo information.

Still another object of the invention is to provide a magnetic disk apparatus capable of increasing a share of data areas by reducing a share of servo areas.

Yet another object of the invention is to provide a magnetic disk apparatus having a large data recording capacity.

According to the present invention, a magnetic disk apparatus carries out a recording or reading operation for a magnetic disk including a plurality of concentric tracks each having data areas for storing a user's data and servo areas followed by the data areas. Each of the servo areas includes servo information for aligning a magnetic head with a center of a target track and an identification signal recorded at a predetermined discrimination frequency to indicate starting position of each of said servo areas. The magnetic disk apparatus includes reproducing means for reading a signal recorded on the target track through the magnetic head and supplying a reproduced signal; first identifying means for extracting a signal component equal to or close to the discrimination frequency from the reproduced signal and generating a first detection signal indicating the period during which the identification signal is generated; second identifying means for detecting the presence or absence of a read data pulse in the reproduced signal and generating a second detection signal indicating the period during which the read data pulse is generated; pulse generating means for generating sampling pulses in a predetermined period of time beginning at a time point where the second detection signal indicates the generation of the read pulses ceases while the first detection signal indicates generation of the identification signal; and positional error detecting means for reading the value of the reproduced signal corresponding to said servo information in synchronism with the sampling pulses, and detecting the positional error of the magnetic head relative to the target track.

BRIEF DESCRIPTION OF THE DRAWINGS

FIG. 3 is a plan view of recording areas of a magnetic disk used in a preferred embodiment of the present invention;

FIG. 4 is a plan view illustrating an example of a servo area of the magnetic disk shown in FIG. 3;

FIG. 11 illustrates another example of a servo area of the magnetic disk shown in FIG. 3.

BRIEF DESCRIPTION OF THE PREFERRED EMBODIMENTS

In order to make the features of the present invention more apparent, a conventional magnetic disk apparatus will be described first.

Figure 1:
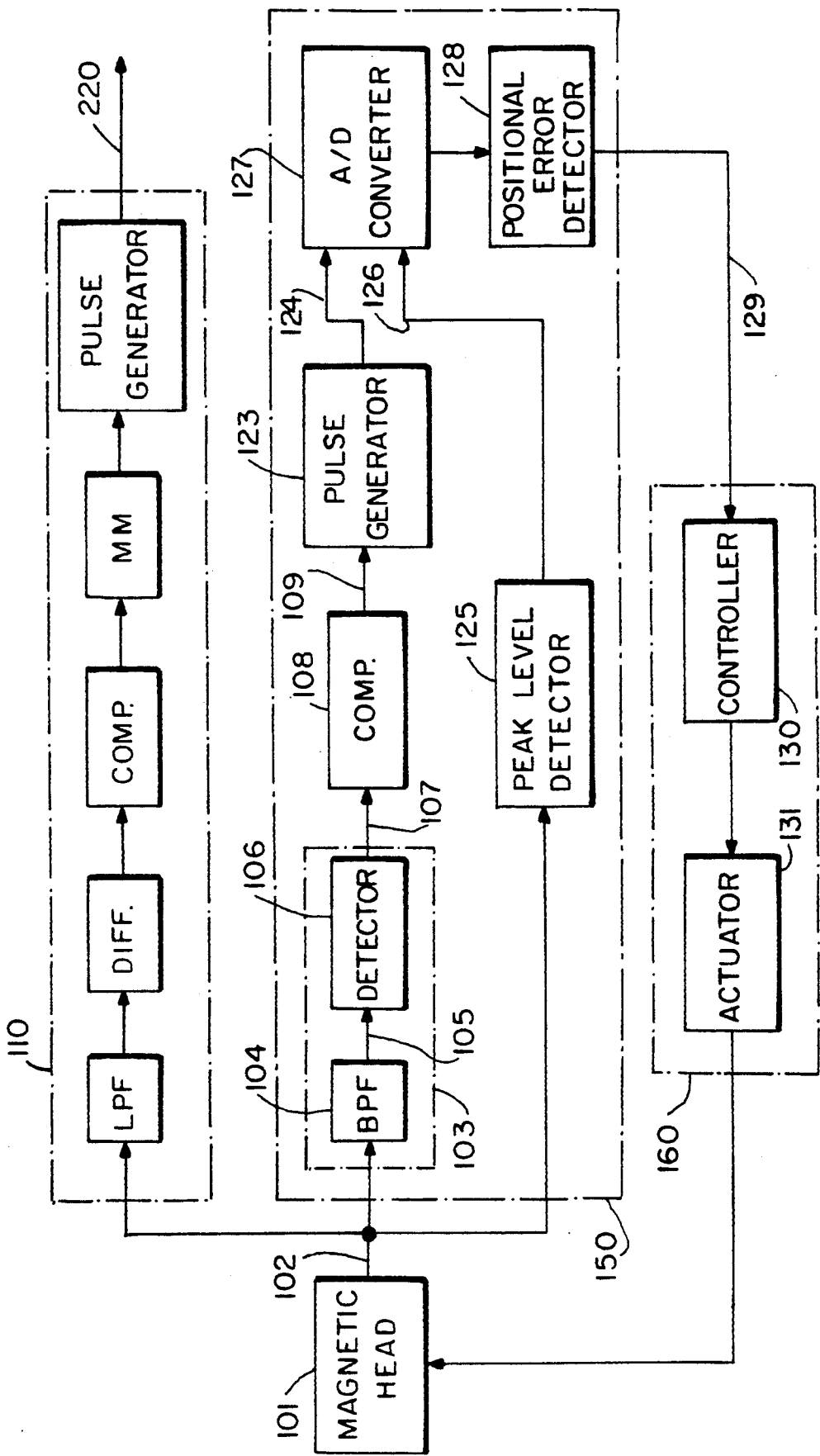
FIG. 1 is a block diagram illustrating a conventional magnetic disk apparatus.

As shown in FIG. 1, the magnetic disk apparatus (floppy disk apparatuses) disclosed in the U.S. Pat. Nos. 5,053,899 and 5,023,732 is provided with a magnetic head 101 for reading information from a magnetic disk (floppy disk) and supplying a reproduced signal 102. A positional error output section 150 detects an error in the position of the magnetic head 101 from the reproduced signal 102 A magnetic head control section 160 controls the position of the magnetic head 101 via an actuator 131 with reference to a positional error signal 129. A data reproducing circuit 110 generates a read data signal 220, represented by read data pulses, from the reproduced signal 102 by extracting peaks of the signal 102.

In the positional error output section 150, a peak level detector 125 produces an envelope signal 126 of the reproduced signal 102, and supplies it to an analog-to-digital (A/D) converter 127. A servo ID detecting circuit 103 extracts the recording frequency components of servo ID patterns from the reproduced signal 102 by means of a band-pass filter 104, and outputs the level of the frequency components of the servo ID patterns to a detector 106. A comparator 108 compares the output signal 107 of the servo ID detecting circuit 103 with a predetermined threshold level, and supplies the result of the comparison as a servo ID area signal 109 to a pulse generator 123. The pulse generator 123, in response to the servo ID area signal 109, generates sampling pulses 124. The analog-to-digital (A/D) converter 127 converts the envelope signal 126 into a digital value at the timing of the sampling pulse 124 A positional error detector 128 produces a positional error signal 129 representing a deviation of the magnetic head 101 relative to the center line of the target track from the digital value received from the A/D converter 127.

The magnetic head control section 160 includes a controller 130 for controlling the position of the magnetic head 101 with reference to the positional error signal 129 in such a direction that the positional error signal 129 is reduced to zero. An actuator 131 receives an output of controller 130, and is mechanically coupled to the magnetic head 101 to control its position.

Figure 2:
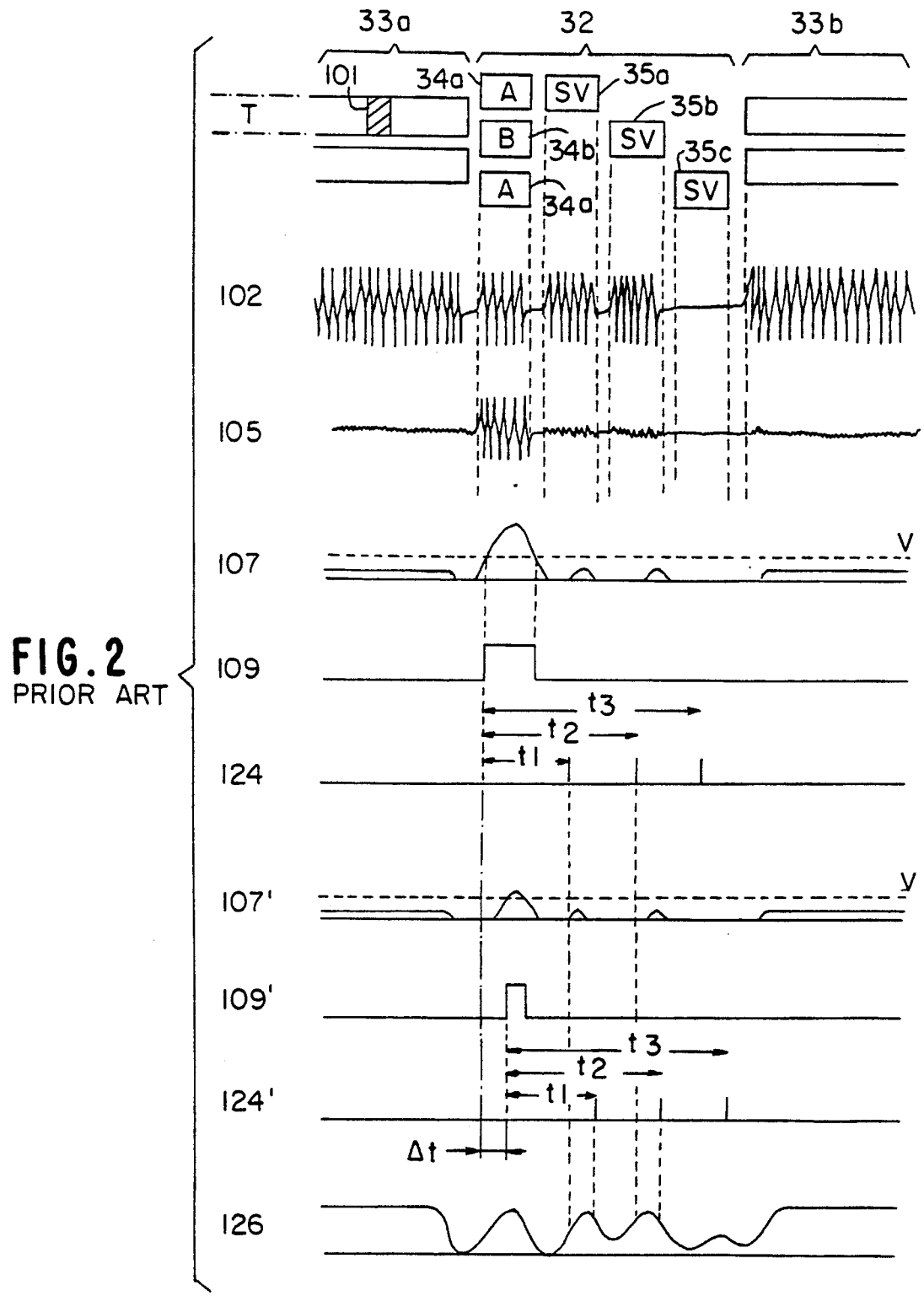
FIG. 2 is a time chart illustrating an operation of the conventional magnetic disk apparatus shown in FIG. 1.

To describe the operation of the floppy disk apparatus with reference to FIG. 2, the magnetic head 101, in the track following mode, reads servo information from a servo area 32 following a data area 33a on a target track T of the floppy disk, and outputs the reproduced signal 102. The servo area 32 involves servo ID sections 34a and 34b indicating the beginning of the servo area 32, and servo information sections 35a, 35b and 35c following the servo ID sections 34a and 34b.

The envelope signal 126 of the reproduced signal 102 is outputted by the peak level detector 125 The band-pass filter 104 extracts the recording frequency signal components 105 of the servo ID sections 34a and 34b from the reproduced signal 102 The output signal 107, indicating the detection of the components 105, from the detector 106 is compared with a predetermined threshold V, and the result of comparison is supplied as the servo ID area signal 109. The pulse generator 123 generates sampling pulses after fixed time periods t1, t2 and t3 from the pulse leading edge of the servo ID area signal 109.

The A/D converter 127 converts, in response to the sampling pulses, analog levels corresponding to outputs from the servo information sections 35a through 35c of the envelope 126 into digital values The positional error detector 128 detects from the output of the A/D converter 127 the positional deviation between the target track T and the magnetic head 101, whose position is so controlled by the controller 130 and the actuator 131 as to reduce the positional error signal 129 to zero.

The data reproducing circuit 110 supplies a pulse corresponding to the peak of the reproduced signals 102 as read data to a floppy disk interface of a computer system.

Thus, the conventional floppy disk apparatus generates the sampling pulses which are triggered by the servo ID area signal 109, whose timing is determined by comparing the output 107 of the servo ID detecting circuit 103 with the predetermined threshold V. Therefore, the A/D converter 127 may become unable to perform accurate A/D conversion of the servo information recorded in the sections 35a and 35b if the output 107 of the servo ID detection circuit 103 varies due to fluctuation of the characteristics of the band-pass filter 104, and so on, as indicated by the detection signals 107 and 107' in FIG. 2. This is because the variation of the signal 107 causes the variation $\Delta t$ in the timings of pulse generation in the servo ID area signals 109 and 109' as indicated in the same figure Accordingly, the servo information sections 35a–35c should be recorded in areas greater than the range of the aforementioned timing variations in the sampling pulses. As a consequence, the floppy disk apparatus inevitably has large servo areas and correspondingly small data areas, which impose a limit to the densification of records.

A preferred embodiment of the present invention will now be described with reference to FIGS. 3 through 11. The same constituent elements as in the above-described conventional apparatus are represented by the same or similar reference numerals, and their descriptions are either abridged or totally dispensed with.

Referring to FIG. 3, a floppy disk 1 has data areas 33 arranged in the circumferential direction of the disk 1. Referring also to FIG. 4, which is a partial enlargement of FIG. 3, one of the servo areas 32 includes servo ID sections 34a and 34b indicating the beginning of the servo area 32. ID patterns are recorded in the ID sections 34a and 34b at different frequencies from the recording frequency of the data sections 33a and 33b, respectively The servo area 32 further includes recordless ID marker sections 36 following the servo ID sections 34a and 34b, and servo information sections 35a, 35b and 35c following the ID marker sections 36. The reason that the adjoining servo ID sections 34a and 34b are recorded at different frequencies is to prevent the reproduced ID pattern from the servo ID section 34a and that from the servo ID section 34b from cancelling each other to make the synthetic output zero when a magnetic head equally covers the servo ID sections 34a and 34b.

Figure 5:
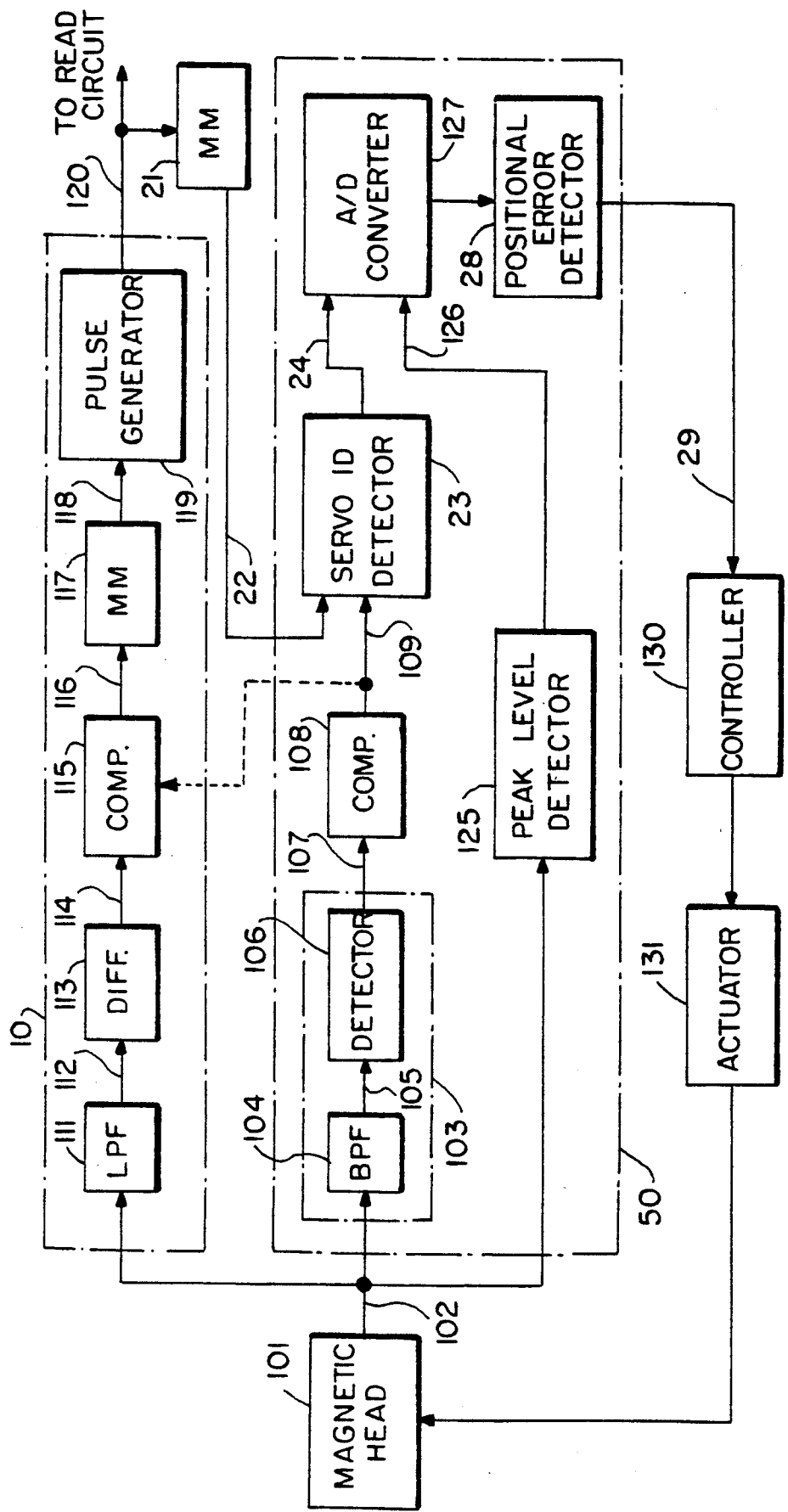
FIG. 5 is a block diagram illustrating a magnetic disk apparatus according to a preferred embodiment of the present invention.

FIG. 5 shows the preferred embodiment of the present invention. This floppy disk apparatus is distinct from the above-described conventional apparatus in that its positional error output section 50 has a servo ID detecting circuit 23 for outputting sampling pulses 24 in response to a servo ID area signal 109 and read data pulses 22. The read data pulses 22 are obtained by supplying a read data signal 120 to a monostable multivibrator 21.

Figure 6:
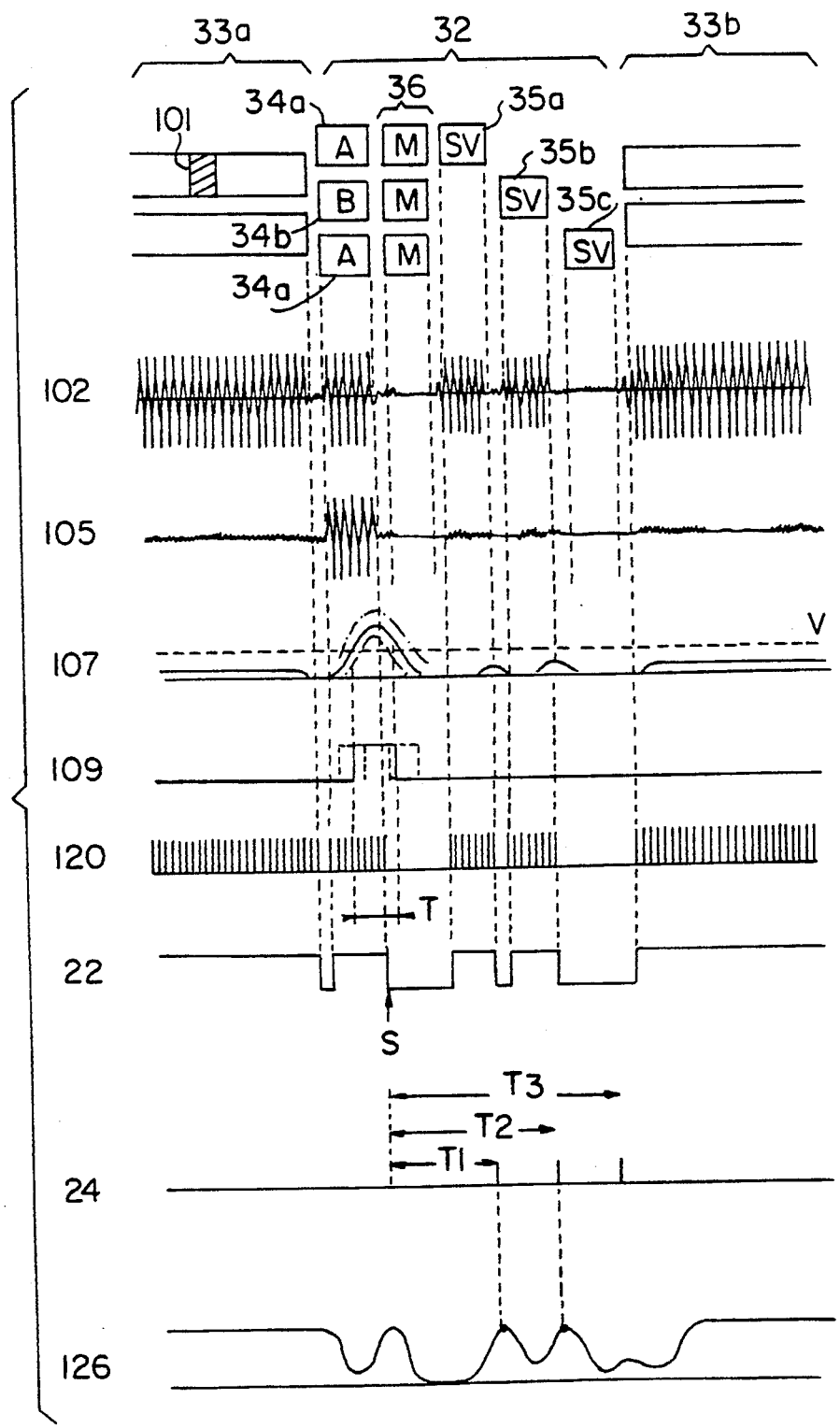
FIG. 6 is a time chart illustrating an operation of the magnetic disk apparatus shown in FIG. 5.

Referring to FIG. 6, information magnetically recorded on the floppy disk medium 1 is read out by a magnetic head 101, and reproduced signal 102 is supplied to a band-pass filter 104 of a servo ID detecting circuit 103 The band-pass filter 104 has center frequencies substantially identical with the recording frequencies of the servo ID sections 34a and 34b. The band-pass filter 104 separates signals of prescribed frequency bands so as to generate an output signal 105 having reduced amplitudes for waveforms which are generated by the servo ID sections 34a and 34b. The detector 106 rectifies and smooths the output signal 105 so that the envelope of the signal 105 is produced as a detection signal 107.

A servo ID comparator 108 compares the output signal 107 with a predetermined threshold level V to generate a servo ID sections 34a and 34b.

A data reproducing circuit 10 reproduces the read data signal 120 from the reproduced signals 102 as described hereinafter in detail. The monostable multivibrator 21 is triggered while read data pulses exist in the read data signal 120 and supplies a read data detection signal 22 to the servo ID detector 23. The detection signal 22 takes a "high" level while the read data pulses exist in the read data signal 120.

The servo ID detecting circuit 23 detects a time point S when the read pulses are not longer generated while the servo ID area signal 109 shows the presence of the servo ID sections 34a and 34b. That is, the servo ID detecting circuit 23 detects the time point S when the level of the data detection signal 22 turns from "high" to "low" while the servo ID area signal 109 is "high". After the lapse of predetermined time periods T1, T2 and T3 from the time point S, the sampling pulses 24 are generated.

Even if the output signal 107 of the servo ID detection circuit 103 varies as indicated by two-dots and dashed lines and the pulse width of the servo ID area signal 109 varies as indicated by the dotted line, the time point S as a starting point for the outputting of the sampling pulses will not change.

An A/D converter 127 converts the potential of the analog level of an envelope signal 126, which is produced by a peak level detecting circuit 125, into digital values at the timings of the sampling pulses 24, and supplies them to a positional error detector 28. The positional error detector 28 generates a positional error signal 29, which represents a deviation of the magnetic head 101 from the target track T, by determining a difference between the two digital values obtained from the servo information sections 35a and 35b. A controller 130 controls the position of the magnetic head 101 via an actuator 131, mechanically coupled to the magnetic head 101, on the basis of the positional error signal 29 as is well known in the art.

Each of the blocks constituting this floppy disk apparatus can have a number of different configurations, which will be described below.

Figure 7:
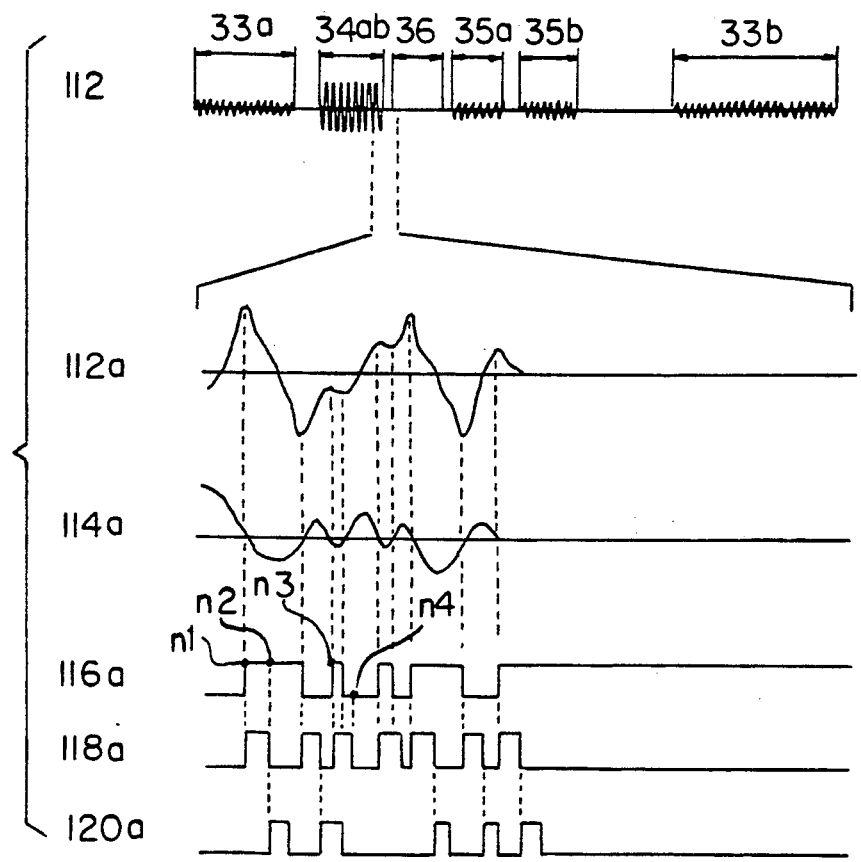
FIG. 7 is a time chart illustrating an operation of a data reproducing circuit in the magnetic disk apparatus shown in FIG. 5.

First, a first operational example of the data reproducing circuit 10 will be described. FIG. 7 illustrates the operation of the data reproducing circuit 10, in which the high frequency components of the reproduced signal 102 are removed by a low-pass filter 111, whose output signal 112a is differentiated by a differentiator 113 to determine the apex of the output signal 112a. Then, a comparator 115 supplies a rectangular signal 116a whose polarity is inverted at the zero-cross point (indicating the apex of the signal 112a) of a differential signal 114a supplied by the differentiator 113. A monostable multi-vibrator 117 is triggered at the leading and trailing edges of the rectangular signal 116a.

A pulse generating circuit 119 outputs the pulses of read data signal 120a when the polarity of the rectangular signal 116a from the comparator 115 at the leading edge of the output signal 118a of the monostable multivibrator 117 is the same as the polarity of the signal 116a at the trailing edge of the signal 118a, in synchronism with the trailing edge of the signal 118a. For example, at a time point n2 which is a trailing edge of the signal 118a, a pulse is generated in data signal 120a since the polarity of the signal 116a at the time point n2 is "high" and the polarity of the signal 116a at a time point n1 which is a pulse rise point of the signal 118a is also "high". At a time point n4 which is a pulse trailing edge of the signal 118a, a pulse is not generated in data signal 120a since the polarity of the signal 116a at the time point n4 is "low" and the polarity at the time point n3 which is a leading edge of the signal 118a is "high".

Figure 8:
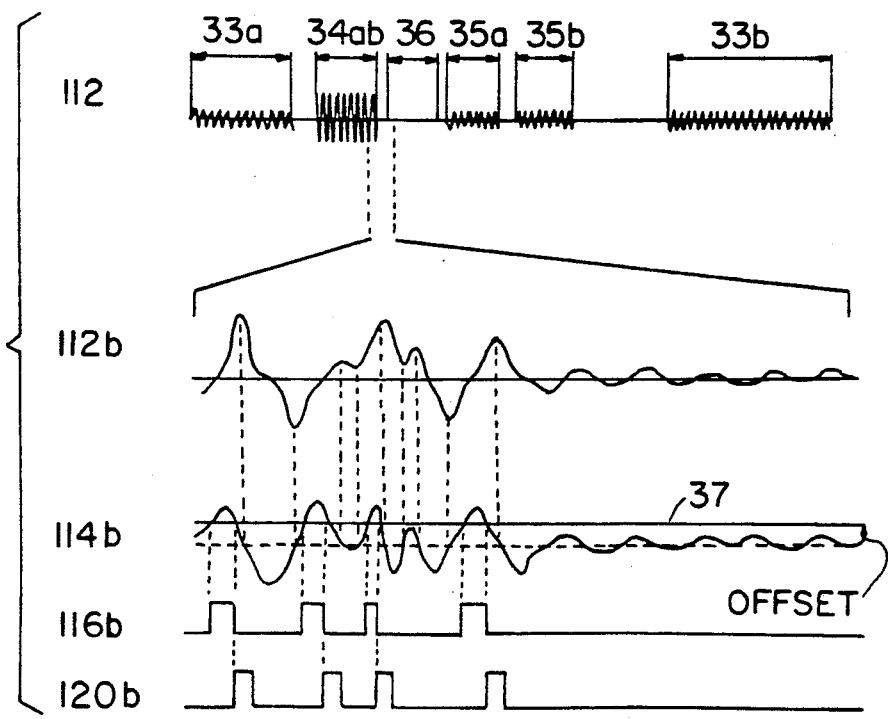
FIG. 8 is a time chart illustrating another example of an operation of the data reproducing circuit in the magnetic disk apparatus shown in FIG. 5.

Next, a second operational example of the data reproducing 10 will be described with reference to FIG. 8. This data reproducing circuit is the same as in the first example to the extent that the high frequency components of the reproduced signals 102 are removed by a low-pass filter 111, whose output signal 112b is differentiated by a differentiator 113. A comparator 115 appropriately offsets its input level by a level 37 in order to remove noise components from the output signal 114b of the differentiator 113 and generates a rectangular signal 116b. A pulse generating circuit 119 outputs the pulses of the read data signal 120b at the trailing edge of the rectangular signal 116b. This data reproducing circuit eliminates erroneous read data pulses attributable to noise components riding on reproduced signal 102 from a marker section 35.

Figure 9:
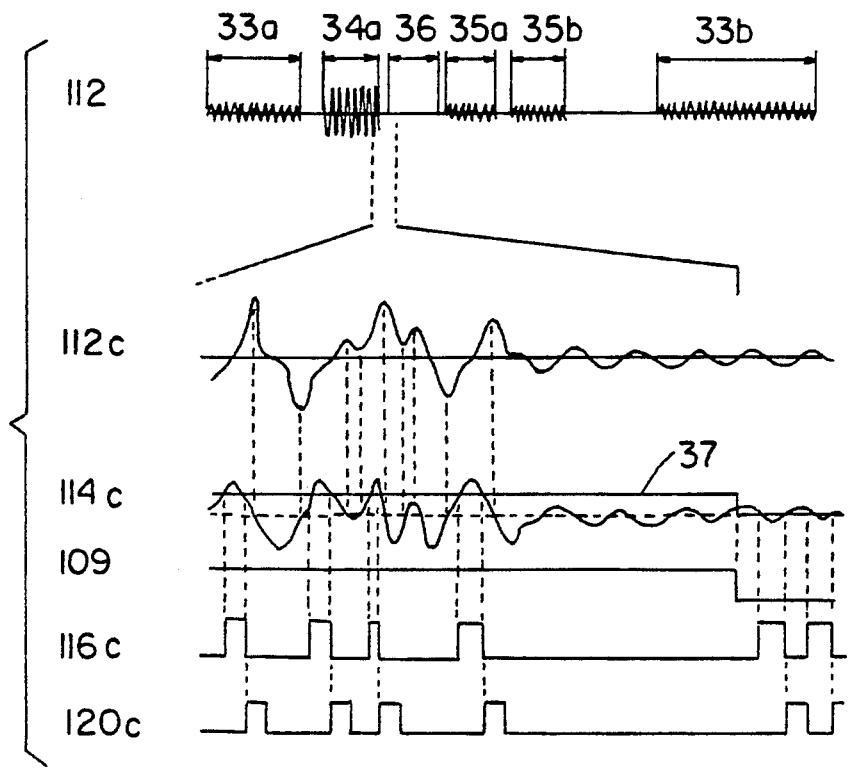
FIG. 9 is a time chart illustrating still another example of an operation of the data reproducing circuit in the magnetic disk apparatus shown in FIG. 5.

A third operational example of the data reproducing circuit will be described next. The data reproducing circuit, whose operation is illustrated in FIG. 9, differs from the second example only in that its comparator 115 is arranged such that a differential signal 114 centered into the comparator 115 is offset only while the logical level of the servo ID area signal 109 of a servo ID comparator 108 is "high" but not offset in any other period. Thus, the comparator 115 offsets the differential signal 114c while the output signal of the servo ID comparator 108 is at a "high" level to prevent the input level of the comparator 115 from conflicting with projections attributable to noise components of the differential signal 114c, and outputs a rectangular signal 116c. The pulse generating circuit 119 supplies the pulses of read data 120 when triggered by the trailing edge of the rectangular signal 116c. The data reproducing circuit described prevents erroneous read data pulses from being generated during the period of servo ID detection.

Figure 10:
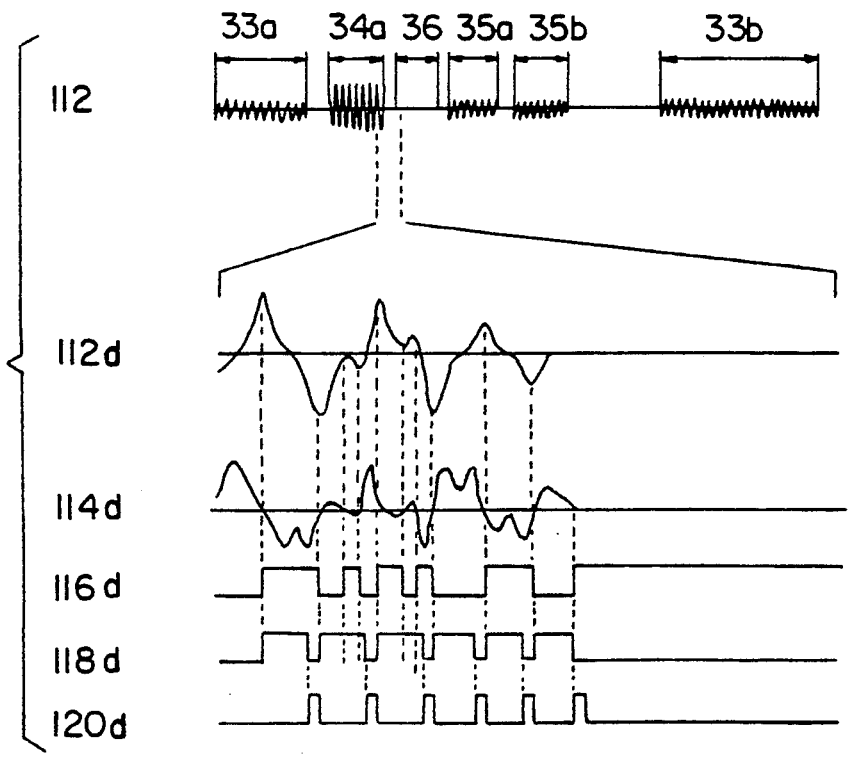
FIG. 10 is a time chart illustrating yet another example of an operation of the data reproducing circuit in the magnetic disk apparatus shown in FIG. 5.

A fourth operational example of the data reproducing circuit will now be described. In the data reproducing circuit, whose operation is illustrated in FIG. 10, the output timings of read data pulses 120d are taken by providing a greater pulse width for the output signal 118d of a monostable multivibrator 121 than in the first example. A pulse generating circuit 119 always outputs the pulses of read data 120d at the trailing edge of the output signal 118d of the monostable multivibrator 117. The generation of erroneous read data pulses attributable to noise components in the servo ID sections 34a and 34b is thereby prevented.

Another example of a recording format for the servo areas on the floppy disk will be described next. Referring to FIG. 11, servo areas 32' are recorded, and servo ID sections 34a and 34b, are followed by ID marker sections 37a and 37b which are indicated by frequencies higher than the recording frequency of the servo ID sections 34a and 34b. Adjoining ID marker sections 37a and 37b are recorded at different frequencies to prevent, when the magnetic head equally covers the ID marker sections 37a and 37b, the reproduced output from the ID marker section 37a and that from the ID marker section 37b from cancelling each other to reduce the synthetic output to zero. Considerably high recording frequencies are provided for the ID marker sections 37a and 37b to securely prevent the generation of read data 120 by enabling the monostable multivibrator 117 to be triggered without fail On this floppy disk as well, the same operation as in the above-described preferred embodiment takes place.

As described, the present invention uses not only the variable output waveform of the servo ID comparator but also stable read data for detecting the positions of servo information sections 35a through 35c and the servo ID is detected when read data pulses are no longer generated during the period in which the servo ID comparator indicates the detection of servo ID sections, resulting in smaller fluctuations of servo ID detection timings than in the prior art. Therefore, the servo areas can be reduced in size, and the records can be densified accordingly.

What is claimed is:

1. A magnetic disk apparatus for carrying out a recording/reading operation for a magnetic disk including a plurality of concentric tracks each having data areas for storing data and servo areas, each of said servo areas including servo information for aligning a magnetic head with a center of a target track and an information signal recorded at a predetermined discrimination frequency to indicate a starting position of each of said servo areas, said magnetic disk apparatus comprising:
    reproducing means for reading a signal recorded on said target track through said magnetic head and supplying a reproduced signal;
    first identifying means for extracting a signal component from said reproduced signal within a predetermined range bounding said predetermined discrimination frequency and generating a first detection signal indicating a period during which said identification signal is generated;
    second identifying means for detecting the presence of a read data pulse in said reproduced signal and generating a second detection signal indicating a period during which said read data pulse is generated;
    pulse generating means for detecting a trailing edge of said second detection signal indicating a beginning of a period of time when output of said read data pulses has terminated while said first detection signal indicates generation of said identification signal, and for generating sampling pulses in a predetermined period of time beginning when said end edge of said second detection signal has been detected; and
    positional error detecting means for reading a value of said reproduced signal corresponding to said servo information in synchronism with said sampling pulses, and detecting a positional error of said magnetic head relative to said target track.

2. The magnetic disk apparatus as claimed in claim 1, further comprising peak level detecting means for detecting an envelope of said reproduced signal, wherein said value read by said positional error detecting means is determined from said envelope of said reproduced signal, and wherein said value is read in synchronism with said sampling pulses.

3. A magnetic disk apparatus for carrying out a recording/reading operation for a magnetic disk including a plurality of concentric tracks each having data areas for storing data and servo areas, each of said servo areas including servo information for aligning a magnetic head with a center of a target track and an information signal recorded at a predetermined discrimination frequency to indicate a starting position of each of said servo areas, said magnetic disk apparatus comprising:
    reproducing means for reading a signal recorded on said target track through said magnetic head and supplying a reproduced signal;
    first identifying means for extracting a signal component from said reproduced signal within a predetermined range bounding said predetermined discrimination frequency and generating a first detection signal indicating a period during which said identification signal is generated;
    second identifying means for detecting the presence of a read data pulse in said reproduced signal and generating a second detection signal indicating a period during which said read data pulse is generated;
    pulse generating means for generating sampling pulses in a predetermined period of time beginning at a time when said second detection signal indicates that generation of said read data pulse has terminated while said first detection signal indicates generation of said identification signal; and
    positional error detecting means for reading a value of said reproduced signal corresponding to said servo information in synchronism with said sampling pulses, and detecting a positional error of said magnetic head relative to said target track;
    wherein said second identifying means includes a low-pass filter for removing high frequency components of said reproduced signal, a differentiating circuit for differentiating an output of said low-pass filter, a comparator for comparing an output of said differentiating circuit with a predetermined level and generating a rectangular output signal, a monostable multivibrator triggered by said rectangular output signal, and read pulse generator.

4. A magnetic disk apparatus for carrying out a recording/reading operation for a magnetic disk including a plurality of concentric tracks each having data areas for storing data and servo areas, each of said servo areas including servo information for aligning a magnetic head with a center of a target track and an identification signal recorded at a predetermined discrimination frequency to indicate a starting position of each of said servo areas, said magnetic disk apparatus comprising:
    reproducing means for reading a signal recorded on said target track through said magnetic head and supplying a reproduced signal;
    first identifying means for extracting a signal component from said reproduced signal within a predetermined range bounding said predetermined discrimination frequency and generating a first detection signal indicating a period during which said identification signal is generated;

second identifying means for detecting the presence of a read data pulse in said reproduced signal and generating a second detection signal indicating a period during which said read data pulse is generated;

pulse generating means for generating sampling pulses in a predetermined period of time beginning at a time when said second detection signal indicates that generation of said read data pulse has terminated while said first detection signal indicates generation of said identification signal; and positional error detecting means for reading a value of said reproduced signal corresponding to said servo information in synchronism with said sampling pulses, and detecting a positional error of said magnetic head relative to said target track;

wherein said second identifying means includes a low-pass filter for removing high frequency components of said reproduced signal, a differentiating circuit for differentiating an output of said low-pass filter, a comparator for comparing an output of said differentiating circuit with a predetermined level and generating a rectangular output signal, a monostable multivibrator triggered by said rectangular output signal, and read pulse generator; and wherein said read pulse generator generates said read data pulse when the polarity of said rectangular output signal from said comparator at a leading edge of an output signal of said monostable multivibrator remains the same at the trailing edge of an output from said monostable multivibrator.

5. A magnetic disk apparatus for carrying out a recording/reading operation for a magnetic disk including a plurality of concentric tracks each having data areas for storing data and servo areas, each of said servo areas including servo information for aligning a magnetic head with a center of a target track and an identification signal recorded at a predetermined discrimination frequency to indicate a starting position of each of said servo areas, said magnetic disk apparatus comprising:

reproducing means for reading a signal recorded on said target track through said magnetic head and supplying a reproduced signal;

first identifying means for extracting a signal component from said reproduced signal within a predetermined range bounding said predetermined discrimination frequency and generating a first detection signal indicating a period during which said identification signal is generated;

second identifying means for detecting the presence of a read data pulse in said reproduced signal and generating a second detection signal indicating a period during which said read data pulse is generated;

pulse generating means for generating sampling pulses in a predetermined period of time beginning at a time when said second detection signal indicates that generation of said read data pulse has terminated while said first detection signal indicates generation of said identification signal; and positional error detecting means for reading a value of said reproduced signal corresponding to said servo information in synchronism with said sampling pulses, and detecting a positional error of said magnetic head relative to said target track;

wherein said second identifying means includes a low-pass filter for removing high frequency components of said reproduced signal, a differentiating circuit for differentiating an output of said low-pass filter, a comparator for comparing an output of said differentiating circuit with a predetermined level and generating a rectangular output signal, a monostable multivibrator triggered by said rectangular output signal, and read pulse generator; and wherein said read pulse generator generates said read data pulse when triggered by the trailing edge of said rectangular output signal from said comparator.

6. A magnetic disk apparatus for carrying out a recording/reading operation for a magnetic disk including a plurality of concentric tracks each having data areas for storing data and servo areas, each of said servo areas including servo information for aligning a magnetic head with a center of a target track and an identification signal recorded at a predetermined discrimination frequency to indicate a starting position of each of said servo areas, said magnetic disk apparatus comprising:

reproducing means for reading a signal recorded on said target track through said magnetic head and supplying a reproduced signal;

first identifying means for extracting a signal component from said reproduced signal within a predetermined range bounding said predetermined discrimination frequency and generating a first detection signal indicating a period during which said identification signal is generated;

second identifying means for detecting the presence of a read data pulse in said reproduced signal and generating a second detection signal indicating a period during which said read data pulse is generated;

pulse generating means for generating sampling pulses in a predetermined period of time beginning at a time when said second detection signal indicates that generation of said read data pulse has terminated while said first detection signal indicates generation of said identification signal; and positional error detecting means for reading a value of said reproduced signal corresponding to said servo information in synchronism with said sampling pulses, and detecting a positional error of said magnetic head relative to said target track;

wherein said second identifying means includes a low-pass filter for removing high frequency components of said reproduced signal, a differentiating circuit for differentiating an output of said low-pass filter, a comparator for comparing an output of said differentiating circuit with a predetermined level and generating a rectangular output signal, a monostable multivibrator triggered by said rectangular output signal, and read pulse generator; and wherein said first identifying means includes a first comparator wherein a differential output signal from said differentiating circuit is offset by said comparator of said second identifying means only when an output signal from said first comparator indicates the presence of said identification signal.

7. A magnetic disk apparatus for carrying out a recording/reading operation for a magnetic disk including a plurality of concentric tracks each having data areas for storing data and servo areas, each of said servo areas including servo information for aligning a magnetic head with a center of a target track and an identification signal recorded at a predetermined discrimination frequency to indicate a starting position of each of said servo areas, said magnetic disk apparatus comprising:

reproducing means for reading a signal recorded on said target track through said magnetic head and supplying a reproduced signal;

first identifying means for extracting a signal component from said reproduced signal within a predetermined range bounding said predetermined discrimination frequency and generating a first detection signal indicating a period during which said identification signal is generated;

second identifying means for detecting the presence of a read data pulse in said reproduced signal and generating a second detection signal indicating a period during which said read data pulse is generated;

pulse generating means for generating sampling pulses in a predetermined period of time beginning at a time when said second detection signal indicates that generation of said read data pulse has terminated while said first detection signal indicates generation of said identification signal; and positional error detecting means for reading a value of said reproduced signal corresponding to said servo information in synchronism with said sampling pulses, and detecting a positional error of said magnetic head relative to said target track;

wherein said second identifying means includes a low-pass filter for removing high frequency components of said reproduced signal, a differentiating circuit for differentiating an output of said low-pass filter, a comparator for comparing an output of said differentiating circuit with a predetermined level and generating a rectangular output signal, a monostable multivibrator triggered by said rectangular output signal, and read pulse generator; and wherein said read pulse generator generates said read data pulse at the trailing edge of said output signal from said monostable multivibrator.

8. A method of reading a magnetic disk comprising the steps of:

reproducing a signal recorded on a target track through a magnetic head to provide a reproduced signal;

detecting a servo area which includes servo information for aligning said magnetic head with a center of said target track, an identification signal recorded at a predetermined discrimination frequency to indicate a starting position of said servo area, and an identification marker arranged between said servo information and said identification signal in said servo area, wherein said identification marker is one of a blank interval and an area recorded at frequencies higher than a recording frequency of said servo information;

generating a first detection signal indicating a beginning of a period of time when said identification signal is generated;

generating a second detection signal indicating a beginning of a period of time when read data pulses are output in said reproduced signal;

detecting a trailing edge of said second detection signal while said first detection signal is output;

generating sampling pulses during a predetermined period of time beginning when said trailing edge of said second detection signal is detected; and determining a positional error from said servo information corresponding to said reproduced signal in synchronism with said sampling pulses.

* * * * *

UNITED STATES PATENT AND TRADEMARK OFFICE
CERTIFICATE OF CORRECTION

PATENT NO.  : 5,317,461

DATED       : May 31, 1994

INVENTOR(S) : Terumitsu OKAMOTO et al.

It is certified that error appears in the above-identified patent and that said Letters Patent is hereby corrected as shown below:

Col. 6, line 17, delete "pulse rise point" and insert --leading edge--;

Col. 6, line 18, delete "pulse";

Col. 6, line 43, delete "114 centered" and insert --114c entered--.

Col. 7, line 19, after "fail", insert --.--;

Col. 7, line 39, delete "information" and insert --identification--.

Signed and Sealed this

Twenty-fourth Day of January, 1995

Attest:

BRUCE LEHMAN

Attesting Officer

Commissioner of Patents and Trademarks